July 14, 1942.　　P. A. KETCHPEL　　2,289,434
STOKER
Original Filed Aug. 2, 1934　　3 Sheets-Sheet 1
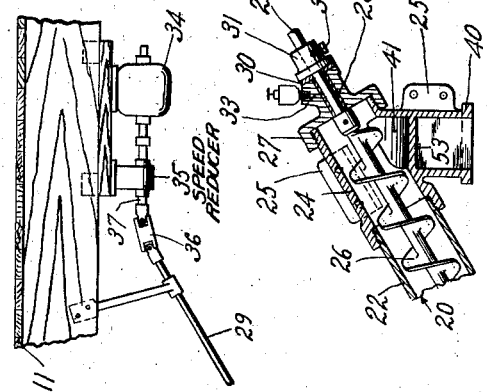
Fig. 5
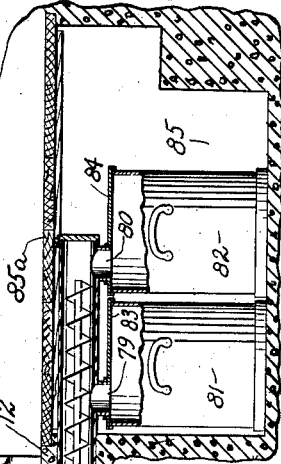
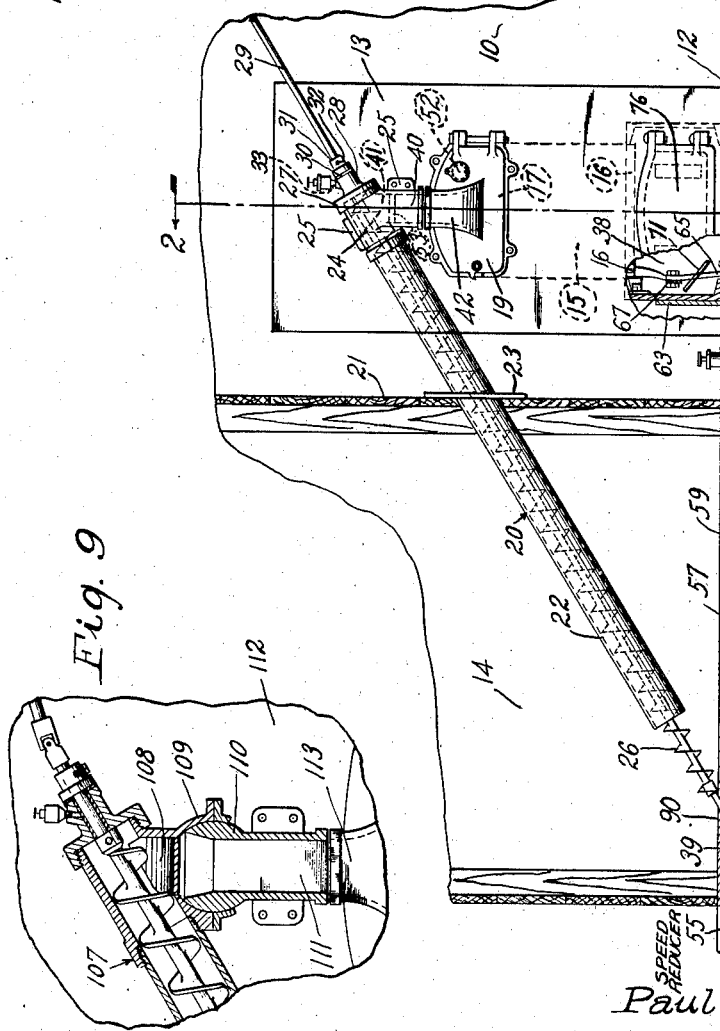
Fig. 1
Fig. 9
INVENTOR.
Paul A. Ketchpel
BY
ATTORNEY.

July 14, 1942.　　　P. A. KETCHPEL　　　2,289,434
STOKER

Original Filed Aug. 2, 1934　　3 Sheets-Sheet 2

INVENTOR.
Paul A. Ketchpel
BY
E. Archer Turner
ATTORNEY.

July 14, 1942.   P. A. KETCHPEL   2,289,434
STOKER
Original Filed Aug. 2, 1934   3 Sheets-Sheet 3
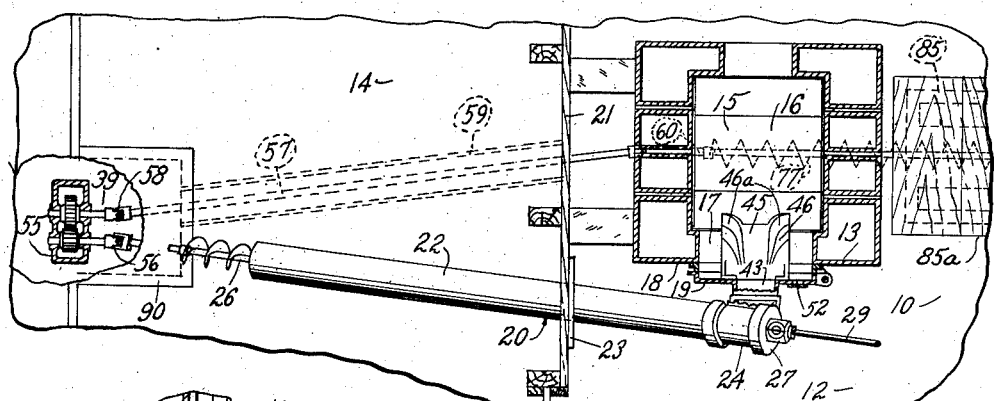
Fig. 3
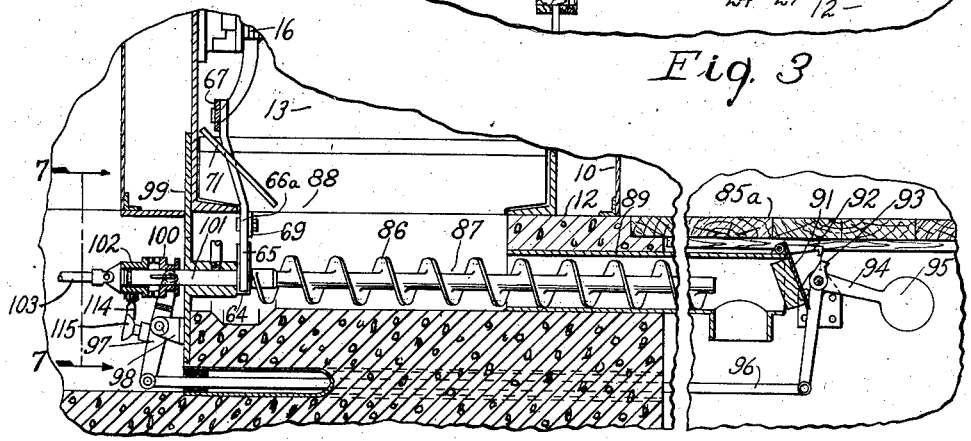
Fig. 6
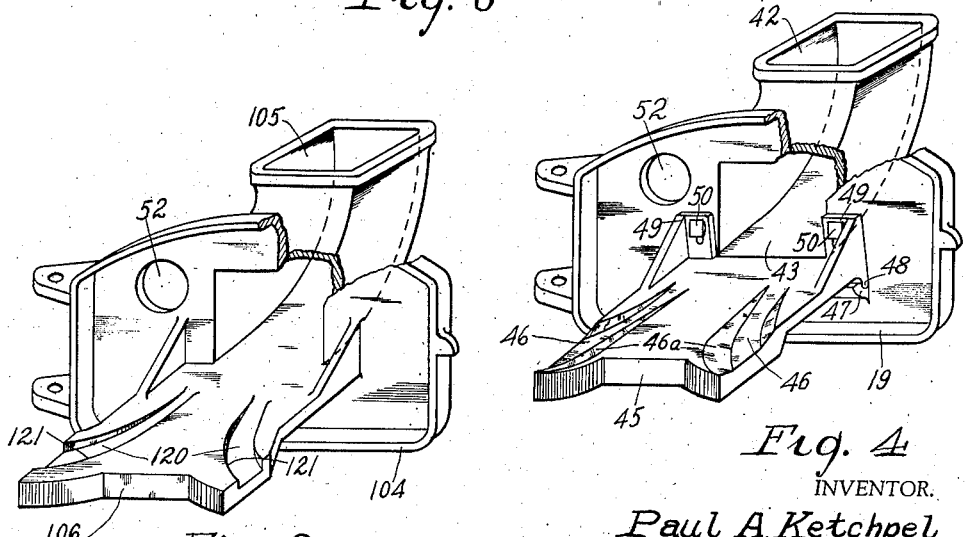
Fig. 8
Fig. 4
INVENTOR.
Paul A. Ketchpel
BY
Archer Turner
ATTORNEY.

Patented July 14, 1942

2,289,434

UNITED STATES PATENT OFFICE 2,289,434

STOKER

Paul A. Ketchpel, West Englewood, N. J., assignor to The Standard Stoker Company, Inc., a corporation of Delaware Application August 2, 1934, Serial No. 738,039
Renewed August 29, 1939

7 Claims. (Cl. 110—118)

My invention relates to new and useful improvements in stokers, particularly for small furnaces such as are employed in the heating of dwellings, apartment houses and green houses.

It is an object of my invention to provide a stoker that is very simple in construction, cheap to manufacture, highly efficient in operation, economical in the consumption of fuel and which increases the useful heating surface of the furnace.

It is another object of my invention to provide a stoker that will convey the fuel from the fuel bin, deliver it through the conventional firing opening and scatter it over the grate in a continuous thin stream maintaining a shallow level fuel bed whereby clinker formation and smoke are greatly minimized.

Another object of my invention resides in the provision, in furnaces of the type described above, of a novel grate shaking arrangement.

Another object of my invention resides in the novel construction and arrangement of means for removing the ash from furnaces of the type above described.

Still another object of my invention is to conserve space in a furnace room by providing a neat and compact novel combination and arrangement of furnace and stoker elements.

To the above and other ends the invention consists in the arrangement of parts and in their relation and association one with the other or in combination as hereinafter described and as illustrated in the accompanying drawings, in which:

Fig. 1 is a vertical sectional view of a furnace room showing a furnace in elevation with parts broken away and with the novel stoker mechanism, grate shaking arrangement and ash removing device shown applied thereto;

Fig. 3 is a sectional plan view through the furnace and bin with the stoker applied and shown in plan, parts being broken away;

Fig. 4 is an isometric view of the novel furnace door and chute with the distributing table applied thereto, Fig. 5 is a sectional view taken on the line 5—5 of Fig. 2;

Fig. 6 is a vertical central section through the lower portion of the furnace with a modified form of ash conveyor applied thereto and shown in similar section;

Fig. 8 is an isometric view of a modified form of door, chute and distributor plate arrangement; and Fig. 9 is a modified form of the construction shown in Fig. 5.

Figure 2:
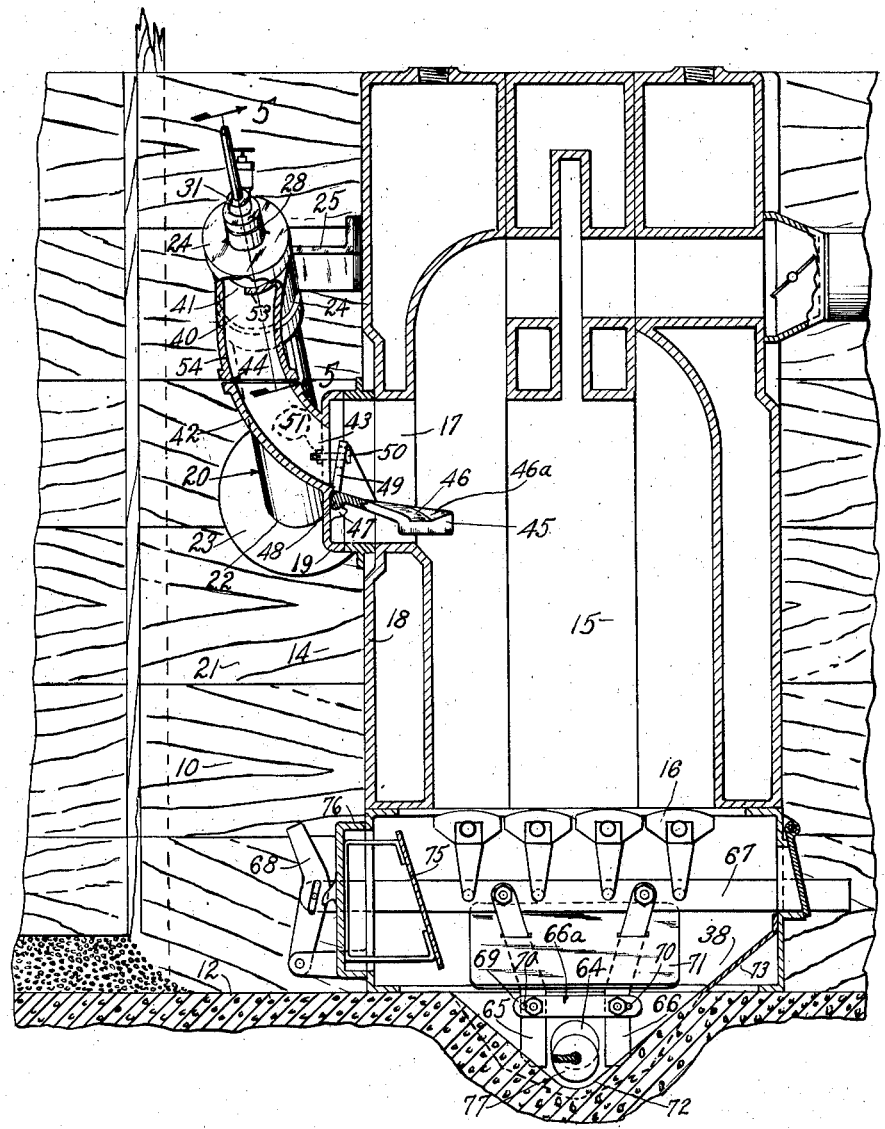
Fig. 2 is a view of the furnace in central vertical section with a stoker applied thereto and shown in elevation with parts broken away.

Referring now to Figs. 1 to 5, inclusive, of the drawings, which illustrate the preferred embodiment of the invention, a furnace room is designated by the numeral 10, its ceiling is shown at 11 and the floor at 12. A furnace is shown at 13, and at 14 is the bin containing the supply of fuel for the furnace. The furnace 13 includes a firebox 15, provided with grate bars 16 forming an ash chamber 38 therebeneath, and a firing opening 17 in the furnace front wall 18 provided with a door 19. The door 19 is arranged to permit manual and stoker firing through the firing opening 17 and the novel construction thereof will be described hereinafter in greater detail.

It will be understood as the description proceeds that the invention is not limited to the particular relations of the bin 14 and the furnace 13 illustrated, since the bin may occupy any one of a number of positions around the furnace and may be nearer to it or farther away. As shown, the bin 14 is at one side of the furnace 13 and a stoker elevating conduit 20 extends upwardly and laterally from a position near the bottom of the bin 14 through the bin wall 21 and terminates a short distance above the firing opening 17 of the furnace 13.

The condition 20 includes a straight tubular casing 22, which may be secured to the bin wall 21 in any suitable manner as by a flange 23, and a casing 24 which is rigidly secured through the flanges 25 to the front wall 18 of the furnace, by suitable fastening means, above the firing opening 17. A screw conveyor 26 is mounted in the elevating conduit 20 and the lower end thereof extends into the bin a distance beyond the lower open end of the elevating conduit 20.

A removable head 27 is threaded on the upper end of the casing 24 forming a closure therefor. The head 27 is arranged to form a bearing 28 for a drive shaft 29 which extends through the head 27 and is operatively connected with the upper end of the screw conveyor 26. The downward thrust of the screw 26 is imparted to the thrust washer 30 by the collar 31 which is secured to the drive shaft 29 in a suitable manner, as by the threaded screw 32. A port 33 provides advantageous and easily accessible means for lubrication of the bearing 28.

The screw conveyor 26 is operated by a motor 34 through suitable speed reducing means 35 and the double universal joint 36 flexibly connecting the drive shaft 29 and the power shaft 37. To conserve space in the furnace room, the motor 34 and speed reducer 35 may be conveniently mounted from the ceiling 11, though it will be apparent that if desired they may be mounted in some other manner. At its lower end, the screw conveyor 26 is mounted in a bearing 90, the screw shaft extending therethrough into a compartment 39 beneath the level of the bin floor. A branch conduit 40 communicates with the casing 24 through an opening 41 in the lower sidewall thereof and is preferably formed integral with the casing 24. The branch conduit 40 is preferably rectangular in shape and curves downwardly from the marginal edges of the opening 41 towards the firing opening 17.

A conduit or chute 42, preferably cast integral with the door 19, curves downwardly from the lower end of the branch conduit 40 and communicates with the firing opening 17 through the opening 43 in the door 19. The adjacent open ends of the branch conduit 40 and conduit 42 are in register and are slightly separated, as shown at 44, a distance sufficient to admit secondary air, to aid in attaining complete combustion of the fuel in the firebox. Separating the adjacent ends of the conduits 40 and 42 also permits the door 19 to be conveniently opened when it is desired to inspect or rake the fire, or to hand fire fuel if the stoker is out of order. The discharge opening 41 of the conduit 20 is a sufficient height above the firing opening 17 so that the fuel passing through the branch conduit 40 and chute 42 attains a velocity due to the action of gravity sufficient to be projected into the firebox. The curved portion of the internal surface of the outer wall of the branch conduit 40 and chute 42 is formed on an arc extending through an angle of approximately 65 degrees and terminates at its lower forward end rearward of the inside surface of the furnace wall 18.

A distributor plate 45 extends forwardly and slightly downwardly from the lower marginal edge of the opening 43 in the door 19, through the firing opening 17 into the firebox. It will be seen from Fig. 3 that the distributor plate 45 does not protrude so far into the furnace that it would interfere with the opening of the door at any time. The top surface of the plate 45 constitutes a substantially tangential continuation of the inner surface of the bottom wall of the conduit 42 and may be slightly curved or concave. A channel 46 is formed in the top surface of the plate 45 on each side of its longitudinal center line. The forward central side of each channel may be formed with an oblique surface 46a. These channels curve forwardly and laterally to the side edges of the plate 45 and serve to direct a portion of the fuel passing over the plate to the rear corners and the sides of the firebox thereby effecting an even distribution of fuel over the grate 16.

The plate 45 is adjustably but securely fastened at its rearward end to the inner surface of the firedoor 19 in the manner to be described. The inner surface of the firedoor 19 is provided beneath the opening 43 with a hook 47 arranged to receive the flange 48 depending from the rearward edge of the plate 45. To permit the slope of the plate 45 to be adjusted, the contacting surfaces of the hook 47 and flange 48 are formed on a radius permitting the plate to be raised or lowered about its rearward end as a pivot. The plate 45 is provided with upstanding flanges 49 at its forward edge, spaced apart a distance to include the opening 43 therebetween. Bolts 50 pass through the flanges 49 and the firedoor 19 and that portion of each of the bolts 50 projecting beyond the firedoor is threaded to receive a nut 51. Thus, the plate 45 may be raised or lower to assume any desired slope from a point without the furnace and without dismantling or disturbing any part of the stoker, by turning the nuts 51.

Opening of the firedoor 19 for inspection of the fire admits too much cold air and is harmful to the boiler parts because of the sudden changes in temperature and is further harmful in that too much air is admitted for proper combustion of the fuel. A deep hole 52 is provided in the door 19 which will permit inspection of the fire without detrimental effects.

The opening 41 through which fuel drops from the upper end of the conveyor screw 26 is preferably partially closed by a curved or sloping inwardly extending ledge 53, the free edge of which is parallel with the opposite wall 54 of the branch conduit 40. The purpose of the ledge 53 is to cause the fuel to spread out and to be discharged in a wide stream against the curving wall 54 of the conduit 40, permitting the fuel to slide along the curving bottom wall of the conduit 42 and to be discharged across the plate 45 into the firebox. Without the ledge 53 a large portion of the fuel would drop through the conduit 40 and would strike the bottom wall of the conduit 42 with the result that the fuel would not pass across the plate in a steady stream thus interfering with the distribution of the fuel by the plate.

In order to prevent the accumulation of ashes on the grates below the fuel bed, which would hinder the natural draft from passing through the fuel bed, a novel grate shaking arrangement is provided. The lower end of the shaft of the screw conveyor 26 extends into the compartment 39 and is connected with the speed reducer 55 by the universal joint 56. Movement is transmitted from the speed reducer 55 to the drive shaft 57 through the universal joint 58. The drive shaft 57 extends forwardly from the speed reducer through a housing 59, which extends beneath the floor of the fuel bin, to the furnace 13 and is connected at its forward end to the shaft 60 by a universal connection 61.

The shaft 60 is mounted in a bearing 62 formed in the plate member 63 and carries an eccentric 64. As the shaft 60 rotates, the eccentric alternately engages the legs 65 and 66, which are a part of the bifurcated extension 66a, rigidly attached with the grate shaker bar 67 by bolts 124 or equivalent means, thereby giving the grates an oscillating motion. A handle 68 is provided for manually shaking the grate 16 independently of the stoker mechanism if it is necessary at any time to fire the furnace manually. To permit of adjustment of the amount that the eccentric 64 rocks the grate 16, a link 69 is provided connecting the legs 65 and 66, which has holes 70 of varied spacing to adjust the lost motion between the eccentric 64 and the legs 65 and 66. A protecting shield or plate 71 may be attached to the legs 65 and 66 to prevent ashes dropping on the eccentric 64 and from getting in the bearing 62.

A depression 72 in the furnace room floor beneath the grate 16 forms a trough into which the ashes fall from the ash pit 38. A slope sheet 73 fixed to the rear wall of the furnace in the ash pit 38 beneath the grate 16 and another sheet 75 secured to the ash door 76 provide a self-cleaning arrangement in the ash pit 38 permitting the ash to drop into the trough 72.

The ashes are conveyed from the trough 72 by the screw conveyor 77 through the conduit 78 and allowed to drop through the outlets 79 and 80 into the ash containers 81 and 82. The ash containers are provided with dust proof lids 83 and 84 closely and telescopically fitting the outlets 79 and 80. To keep the ash containers out of sight and provide more floor space, they are disposed in the compartment 85 beneath the furnace room floor, this compartment being covered by the door 85a.

Figure 7:
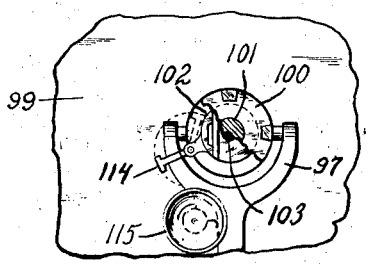
Fig. 7 is a sectional view on the line 7—7 of Fig. 6.

In Figs. 6 and 7 is shown a modified form of the ash removing device, wherein means is provided for stopping the ash conveyor 86 after the ash receptacles have become filled, allowing the ashes to accumulate in the trough 87 and ash pit 88. The ash conveyor conduit 89 has a hinged door or end cover 91 that is pushed open by the accumulation of ashes in the conduit 89 when the ash receptacles are filled. Opening of the door 91 moves a catch 92 and releases the latch 93 mounted on the same shaft as the bell crank 94, which by reason of the weight 95 swings downward moving the rod 96 toward the left.

The rod 96 is connected with the lower end of a clutch yoke 97 which is pivotally mounted at 125 in a bracket 98 attached to the end plate 99. The yoke 97 engages the clutch member 100 which is slidably keyed on the shaft 101. Normally the clutch member 100 is in engagement with a companion clutch member 102 universally connected with and driven by the shaft 103; however when the accumulation of ash at the end of the conduit 89 opens the door 91 releasing the latch 93 and causing the bell crank 94 to move the shaft 96 to the left, the clutch members 100 and 102 are disengaged, as shown in Figure 6 and operation of the ash conveyor screw 86 is stopped.

An alarm may be provided for indicating when the clutch members 100 and 102 have become disengaged and have thereby interrupted the operation of the ash conveyor 86. A clapper 114 is pivotally attached at one end to the clutch member 102, as at 126, and rotates therewith. Looking at Figure 7, the clutch member 102 rotates in a counterclockwise direction and the clapper 114, during the ascending portion of its movement, because of its pivotal connection 126, rests against the hub portion of the clutch member 102. During the descending portion of its movement the clapper 114 becomes overbalanced and swings downwardly about its pivotal connection 126 striking the bell 115. The bell 115 is mounted on the yoke 97 below the pivotal connection 125 and moves into the path of the clapper 114 when the yoke is moved by the rod 96 in a direction to shift the clutch member 100 out of engagement with the clutch member 102.

In Figure 8 is shown a modified form of the door, chute and plate arrangement in which the door 104, chute 105 and distributor plate 106 are all made integral.

The distributor plate 45 or 106 may be formed as shown in Fig. 8, having channels 120 and laterally extending ridges or abutments 121 on each side to effect an even delivery of the fuel in the rear corners of larger fireboxes.

As shown in Fig. 9, the stoker fuel conduit 107 is provided at its discharge opening 108 with a spherical flange 109 arranged to receive the ball portion 110 of the conduit 111 forming a universal connection therebetween. The conduit 111 is rigidly secured to the furnace 112 by any suitable means and at its open lower end communicates with the chute 113. This arrangement facilitates the installation of the stoker to a furnace where the coal bin is not in line with the furnace.

From the foregoing description it will be apparent that the novel combination and arrangement of parts together with the particular structure of various elements permits the maintenance of a shallow level fuel bed that is continuously being replenished. The stoker is arranged to feed fuel to the furnace continuously in a thin even stream; the grate shaking device, since its operation is synchronized with the stoker, shakes the ashes from the fire as rapidly as the fuel is consumed; and, the ash removing device continuously conveys the ashes away. As a result, a thin even fire, free from ashes, may be constantly maintained.

A shallow fire burns at a much higher temperature and more nearly resembles gas and oil fires, because the natural draft of the chimney can cause the air to pass up through the fire bed and produce a more nearly perfect combustion of the fuel than is possible with a deep fire and a forced draft. Also an increase in the useful heating surface of the furnace is gained over those types of stokers that carry a deep fire bed, since in the latter the fire bed smoulders at a relatively low temperature and usually includes an accumulation of ash. Tests have also shown that the flue gases taken from a furnace having a comparatively thin and hot fire contain a great deal less unburned carbon than the flue gases taken from a slow smouldering fire, such as is the condition in deep fire beds.

I claim:

1. As an article of manufacture, a firedoor for a stoker fired furnace, said firedoor having an opening therethrough, a chute formed with said firedoor and communicating with the opening therein, said chute having a curved uninterrupted and unobstructed fuel supporting surface throughout its axial extent and a horizontal ledge formed integral with the inner surface of said firedoor subjacent the opening therethrough, said ledge having a bearing surface.

2. As an article of manufacture, a firedoor for a stoker fired furnace, said firedoor having an opening therethrough, a substantially 90 degree upturned elbow-like chute formed with said firedoor and communicating with the opening therein, said chute in cross section being substantially rectangular and having a curved uninterrupted and unobstructed fuel supporting surface throughout its axial extent and a horizontal ledge formed integral with the inner surface of the door subjacent the opening therethrough, said ledge having a curved bearing surface.

3. The combination with a furnace having a firing opening, of a firedoor provided with an opening therethrough, a fuel chute formed with said door and communicating with the opening therein, said chute having a smooth uninterrupted and unobstructed fuel supporting surface, said fuel supporting surface being curved throughout the axial extent of said chute, a ledge formed integral with the inner surface of said firedoor subjacent the opening therethrough, a distributor plate having a depending flange at the rearward end thereof engaging said ledge, said ledge and flange being arranged to form a pivot to provide for vertical swinging movement of said plate about its rearward end, and means for adjusting and securing said plate in any one of a number of positions.

4. The combination with a furnace having a firing opening, of a firedoor provided with an opening therethrough, a fuel chute formed with said door and communicating with the opening therein, said chute having a smooth uninterrupted and unobstructed fuel supporting surface, said fuel supporting surface being curved throughout the axial extent of said chute, a ledge formed integral with the inner surface of said firedoor subjacent the opening therethrough, a distributor plate having a depending flange at the rearward end thereof engaging said ledge, said ledge and flange being arranged to form a pivot to provide for vertical swinging movement of said plate about its rearward end, and means for adjusting and securing said plate in any one of a number of positions, said plate forming a continuation of the fuel supporting surface of said chute and having means at the forward end thereof for deflecting fuel laterally.

5. In a stoker for a furnace provided with a firing opening, a fuel discharge conduit extending downwardly and forwardly from a source of fuel supply to the firing opening, said discharge conduit comprising an upstanding tubular upper portion and a curved elbow lower portion, the inner surface of the outer portion of the curved elbow being smooth and unobstructed throughout the axial extent of said elbow, the said inner curved surface of said elbow constituting a fuel supporting surface across which the fuel dropping by gravity through said upstanding upper tubular portion passes and effecting a gradual change in the direction of flow of the fuel from a downward to a forward direction, a transverse ledge within and extending partially across the upper end of said tubular upper portion for directing the fuel toward the said inner surface of the outer portion of the curved elbow, the slope of said inner curved surface and the length of said upstanding upper tubular portion being such that fuel will pass therethrough and be discharged a substantial distance into the furnace solely by the momentum gathered by the fuel in dropping through said discharge conduit, and means at the discharge end of said discharge conduit for deflecting a portion of the issuing fuel laterally to the rear corners of said furnace.

6. In a stoker for a furnace having a grate and a firing opening above the level of said grate, the combination of an inclined fuel feed conduit extending from a source of fuel supply to a position near the furnace and above the level of the firing opening therein, means for advancing fuel through said feed conduit, said conduit having a discharge opening at that end nearest the furnace, a discharge conduit communicating with the discharge opening in said feed conduit and extending downwardly and forwardly to said firing opening, said discharge conduit comprising an upstanding tubular upper portion and a lower chute portion, the inner surface of the outer portion of the chute being smooth and unobstructed throughout the axial extent of said chute, and a ledge adjacent the discharge opening of said fuel feed conduit extending partially across the upper end of said upstanding tubular upper portion for spreading the fuel in a widening stream and directing said stream toward the said inner surface of the outer portion of the chute, the said inner surface of the chute constituting a fuel supporting surface across which the fuel dropping by gravity through said upper tubular portion passes to the discharge end of said chute, the slope of said inner surface and the length of said upstanding tubular upper portion being such that the fuel will pass therethrough and be discharged a substantial distance into the furnace solely by the momentum gathered by the fuel in dropping through said discharge conduit.

7. In a stoker for a furnace provided with a firing opening, the combination of a screw conveyor for raising and positively feeding the fuel, an arcuate conduit arranged with its upper extremity receiving fuel positively fed by said conveyor and with its lower extremity supplying the fuel to the firing opening, the internal surface of the outer wall of the arcuate conduit forming a concave arc to divert the falling fuel without breaking its momentum, a ledge projecting within the upper end of said conduit and extending transversely thereof across which ledge the fuel is discharged in a widening stream and directed toward the said internal surface of the outer wall of said arcuate conduit, a distributing member extending into the furnace and having an upper surface forming a substantially tangential extension of said arc, and means on said upper surface for deflecting a part of the fuel to each side of the fire for the even distribution of the fuel, and the gravity drop of the fuel constituting the sole and sufficient means to ensure the momentum necessary for the said fuel distribution.

PAUL A. KETCHPEL.